US007494676B2

(12) United States Patent
Chakrabarti et al.

(10) Patent No.: US 7,494,676 B2
(45) Date of Patent: Feb. 24, 2009

(54) PROCESS FOR THE PRE-TREATMENT OF VEGETABLE OILS FOR PHYSICAL REFINING

(75) Inventors: Pradosh Prasad Chakrabarti, Hyderabad (IN); Bhamidipati Venkata Surya Kopeswara Rao, Hyderabad (IN); Samir Kumar Roy, Hyderabad (IN); Lakshmi Anu Prabhavati Devi Bethala, Hyderabad (IN); Prasanna Rani Karna Narayana, Hyderabad (IN); Vandana Vemulapalli, Hyderabad (IN); Kalyani Chelimi, Hyderabad (IN); Gadam Karthika, Hyderabad (IN); Vijay Kale, Hyderabad (IN); Rachapudi Badari Narayana Prasad, Hyderabad (IN)

(73) Assignee: Council of Scientific and Industrial Research, New Delhi (IN)

( * ) Notice: Subject to any disclaimer, the term of this patent is extended or adjusted under 35 U.S.C. 154(b) by 820 days.

(21) Appl. No.: 10/449,698

(22) Filed: May 30, 2003

(65) Prior Publication Data

US 2004/0005399 A1 Jan. 8, 2004

(51) Int. Cl.
*A23D 9/007* (2006.01)

(52) U.S. Cl. ........................... 426/33; 426/52; 426/601; 435/262; 435/267; 435/271

(58) Field of Classification Search ................... 426/52, 426/33, 601; 435/271, 262, 267
See application file for complete search history.

(56) References Cited

U.S. PATENT DOCUMENTS

| | | | | |
|---|---|---|---|---|
| 4,981,620 | A * | 1/1991 | Anghelescu et al. | 554/175 |
| 5,264,367 | A * | 11/1993 | Aalrust et al. | 435/271 |

FOREIGN PATENT DOCUMENTS

| | | |
|---|---|---|
| JP | 63-040889 | * 12/1994 |
| JP | 11-131089 | * 5/1999 |

OTHER PUBLICATIONS

S.K. Roy et al.; "Enzymatic Degumming of Rice Bran Oil" Journal of the American Oil Chemist's Society., vol. 79, No. 8, 2002, pp. 845-846.

K. Clausen.; "Enzymatic Oil-Degumming by a Novel . . . Phospholipase" European Journal . . . Technology., vol. 103, No. 6, 2001, pp. 333-340.

T.N.B. Kaimal et al.; "Origin of Problems Encountered in . . . Processing" European Journal . . . Technology., vol. 104, No. 4, 2002, pp. 203-211.

* cited by examiner

*Primary Examiner*—Arthur L Corbin
(74) *Attorney, Agent, or Firm*—Ladas & Parry LLP

(57) ABSTRACT

The present invention relates to a simple and economically attractive process for the pretreatment of vegetable oils which involves (a) enzymatic degumming with commercially available phospholipase $A_1$ from the sources like *Aspergillus oryzae* microorganism, (b) bleaching of the enzymatically degummed oil using bleaching earth and activated carbon, and (c) dewaxing (in case of rice bran oil) of degummed and bleached oil at lower temperature to obtain oil with less than 5 ppm of residual phosphorus which is amenable for physical refining.

15 Claims, No Drawings

PROCESS FOR THE PRE-TREATMENT OF VEGETABLE OILS FOR PHYSICAL REFINING

FIELD OF THE INVENTION

The present invention relates to a process for the pretreatment of vegetable oils such as rice bran oil, soybean oil, sunflower oil and palm oil for physical refining.

More particularly, the present invention relates to a simple and economically attractive process for the pretreatment of vegetable oils which involves (a) enzymatic degumming with commercially available phospholipase $A_1$ from the sources like *Aspergillus oryzae* microorganism, (b) bleaching of the enzymatically degummed oil using bleaching earth and activated carbon, and (c) dewaxing (in case of rice bran oil) of degummed and bleached oil at lower temperature to obtain oil with less than 5 ppm of residual phosphorus which is amenable for physical refining.

BACKGROUND OF THE INVENTION

Vegetable oils contain a number of impurities such as phospholipids, fatty acids, pigments, odoriferous compounds that must be removed from the oils to make them suitable for direct human consumption. The refining of edible oils and fats can be carried out using two routes, namely chemical and physical refining. In chemical refining, the oil is treated with water followed by alkali to make it free of gums and free fatty acids. Alkali reacts with free fatty acids and produces soap which in presence of oil and water, forms considerable amount of emulsion wherein neutral oil gets occluded resulting in high oil loss. Particularly, for oils containing high free fatty acids like rice bran oil, emulsification causes higher refining losses. The soapstock produced in this process poses serious disposal problems. The physical refining method, the most viable alternative, involves processing of degummed oils where free fatty acids are removed by steam stripping along with deodorization. Consequently, oil losses are reduced, free fatty acid is distilled out with improved quality.

Physical refining is more attractive for the vegetable oils having higher contents of free fatty acids. However, practical experience with physical refining shows that it leads to desirable results only when a very good quality feed is used. Phosphorus content of less than 5 ppm is ideal. For successful operation of physical refining, efficient pretreatment steps are, therefore, of utmost importance.

The major emphasis, thus, has to be placed on pre-processing of crude oil prior to physical refining. Researchers have shifted their interests towards establishment of an efficient degumming process that reduces the phosphorus level to less than 5 ppm. Water degumming is the simplest method for removing hydratable phospholipids leaving 80 to 200 ppm of phosphorus in the oil, depending upon the type and quality of the crude oil due to the presence of non-hydratable phospholipids. A number of degumming techniques were suggested like acid degumming (Hvolvy, A., J. Am. Oil chem. Soc., 48, 971, 503), superdegumming (Ringers, H. J. and J. C. Segers, German Patent, 2609705, 1976), unidegumming (Vande Sande, et al., EP 0348004, 1989), membrane degumming etc. (Sengupta, A. K., U.S. Pat. No. 4,062,882, 1977) to remove the non-hydratable phospholipids. However, all these methods had their inherent disadvantages and could not be applied in industrial scale for all the oils irrespective of their initial quality.

Enzymatic degumming was first reported by Roehm and Lurgi and was known as Enzymax Process (Penk, G., E. et al., EP 0513709, 1992). Phospholipase $A_2$ was used to hydrolyze the non-hydratable phospholipids to their hydratable lyso-compounds. This was applied for soybean, rapeseed and sunflower oils, after an initial water degumming step to obtain phosphorus levels upto a level of 5 ppm. The usual bleaching step after the enzymax process would lead to an oil fit for physical refining. The enzyme used was isolated from the porcine pancreas. The availability of the porcine pancreas based enzyme is limited and may be difficult to match its requirement on a commercial scale.

The Lurgi process comprises mixing the crude vegetable oil and citric acid and heating to a temperature of up to about 70° C. and then cooling to a temperature in the range of 40-45° C. and then adding NaOH and then treating with the enzyme at a temperature in the range of 40-45° C. for about 6 hours followed by centrifuging at a temperature of about 70° C. to obtain the degummed oil. The cost of this process is quite high.

Aalrust, E., et al., in their U.S. Pat. No. [5,264,367 (1993)] reported the enzymatic degumming of water degummed soybean oil containing 130 ppm of phosphorus with 1000 units of phospholipase $A_2$ per one liter of soybean oil in presence of sodium citrate (1 g) and sodium dodecylsulfate (20 g) in 33.3 g of water. The oil was circulated about 3 times per minute by an external centrifugal pump for 3 hours followed by heating the oil to 75° C. and continuing the treatment for one further hour to obtain oil with 3 ppm of phosphorus. The main drawback of this process is employing huge amounts of sodium dodecyl sulfate. Water is also used upto 3.3%.

Yagi et al., (U.S. Pat. No. 5,532,163) also reported the enzymatic degumming using phospholipase $A_2$ based on porcine pancreas (100 to 2000 units per kg of oil) to degum unpurified soybean oil. However, the researchers employed very huge amounts of water in the form of enzyme solution i.e., 1.5 liters of an enzyme solution per 1.5 kg of soybean oil, which is not an economically feasible process.

A few more groups reported the enzymatic degumming of vegetable oils using phospholipase $A_2$ isolated from porcin pancreas with slight modifications to the process (Yagi, T., M. et al, JPA-2-153997, U.S. Pat. No. 5,532,163, 1996; Aalrust, E., U.S. Pat. No. 5,264,367, 1993).

It was clearly felt that to make the process commercially viable, an alternative source for the enzyme had to be found out and M/s. Novozymes came out with a microbial sources for phospholipase enzymes. Phospholipase $A_1$ isolated from *Fusarium oxysporum* was utilized for the enzymatic degumming of vegetable oils (K. Clausen, Eur. J. Lipid Sci. Technol. 103, 2001, p. 333-340). In the reported enzymatic processes mainly soybean, rapeseed and sunflower oils were subjected to an initial step of conventional water degumming. The water degummed oil was then mixed with 0.1 to 0.15% of citric acid at a temperature of 70-75° C. using a high shear mixer and cooled to 40-60° C. and then 0.03 to 0.05% of sodium hydroxide was added to it and mixed thoroughly. In the next step, 100 to 800 LEU of Lecitase-Novo and more preferably 375 units per kg of oil was mixed using a high shear mixer and then kept under stirring for 5-6 hours at 40° C. The oil was heated to 70° C. and centrifuged to get enzymatically degummed oil. The major disadvantages of the reported processes are addition of citric acid, sodium hydroxide and enzyme solution in water in a series of operations maintaining specific pH range and higher reaction times. The enzymatic degumming was also not extended to rice bran oil herein.

Loeffler et al in their U.S. Pat. No. (6,001,640, 1999) reported the enzymatic degumming of wet-degummed soybean oil with a residual phosphorus content of 190 ppm at 40° C. in presence of water (a 5% on the basis of oil) and citric acid (1%) using phospholipase isolated from Aspergillus niger. The low phosphorus content of <10 ppm was achieved in 6 hours. The process requires higher percent of water, citric acid and also longer hours of degumming period.

EP-A 0622 446 describes an enzymatic process for degumming of oils, which comprises several processing steps. After treatment with phospholipase the enzyme solution was centrifuged off, the remaining oil washed with water at a pH of 3-6, and finally treated with fuller's earth. During the enzymatic treatment and the washing step, large amounts of water was used specifically 30-200 weight % with reference to the oil used.

OBJECTS OF THE INVENTION

The main object of the present invention is to provide an improved process for the enzymatic degumming of vegetable oils using protocols like addition of enzyme solution with or without chemicals such as citric acid and sodium hydroxide.

Another object of the present invention is carrying out the enzymatic degumming of vegetable oils like rice bran oil, soybean oil.

Another object of the present invention is to develop an improved enzymatic degumming method-using phospholipase $A_1$ (Novozymes A/s, Denmark) isolated from a microorganism such as *Aspergillus oryzae.*

Yet another object of the present invention is to develop an enzymatic degumming process with reduced reaction time compared to the existing protocols of the prior art.

Yet another object of the present invention is to carry out enzymatic degumming in a single step with the addition of citric acid and sodium hydroxide along with enzyme solution instead of adding these in three different stages as reported in the existing methodologies.

Yet another object of the present invention is to develop a process wherein the enzymatic degumming is also performed only with enzyme solution without the addition of citric acid and sodium hydroxide and without maintaining any specific pH.

Yet another object of the present invention is to develop an environment-friendly process without the requirement of water-wash step after enzymatic degumming to reduce effluent stream generation.

Yet another object of the present invention is to develop a pretreatment step for physical refining of oils like rice bran oil, soybean oil etc. to reduce the loss of oil considerably during the enzymatic degumming step compared to the conventional degumming process.

Yet another object of the present invention is to obtain pre-treated oil with less than 5 ppm of phosphorus for physical refining.

SUMMARY OF THE INVENTION

Accordingly, the present invention provides a process for the pretreatment of a vegetable oil selected from the group consisting of rice bran oil, soybean oil, sunflower oil and palm oil prior to physical refining of said vegetable oil, said process comprising subjecting the vegetable oil to enzymatic degumming using a phospholipase $A_1$ enzyme, separating the gums, and bleaching the degummed product so obtained.

In another embodiment of the invention, the vegetable oil is subjected to degumming without the addition of citric acid and sodium hydroxide.

In yet another embodiment of the present invention citric acid and sodium hydroxide are added to the vegetable oil along with the enzyme as a single dose in order to maintain the pH of the mixture.

In yet another embodiment of the invention, the vegetable oil is rice bran oil and the degummed rice bran oil is subjected to dewaxing after bleaching.

In another embodiment of the present invention, the enzyme Phospholipase $A_1$ is isolated from a microbial source such as *Aspergillus oryzae.*

In another embodiment of the invention, the enzyme is added in the form of a solution with an activity range of 200-520 units per kg of oil.

In another embodiment of the invention, the bleaching is carried out using 2 to 4% bleaching earth and 0-1% activated carbon.

In another embodiment of the invention, the amount of citric acid used is 0 to 0.065% of oil and amount of sodium hydroxide used is 0-0.02% of oil.

In another embodiment of the invention, the enzymatic degumming is carried out for a period in the range of 20 to 120 minutes and at a temperature of 35-45° C. followed by heating the enzymatically treated oil to a temperature in the range of 70 to 80° C.

In yet another embodiment of the invention, the removal of the gums after enzymatic treatment is carried out using a continuous centrifuge.

In yet another embodiment of the invention, the degummed and bleached oil is subjected to cooling to a temperature in the range of 18-20° C. at a rate 0.2-0.5° C. per minute with gentle stirring for a time period in the range of 12 to 18 hours to obtain oil with less than 5 ppm of residual phosphorus and which is amenable for physical refining.

In yet another embodiment the consumption of bleaching earth is reduced to 0.5 to 1% compared to the conventional process for getting the similar quality of oil along with reduction of oil loss by way of spent bleaching earth particularly in case of rice bran oil.

In still yet another embodiment of the present invention, the conventional water wash step after degumming is avoided after enzymatic degumming.

In still yet another embodiment of the present invention, the oil is exposed for shorter durations at higher temperature compared to the conventional process and also in the enzymatic processes in the prior art, reducing the chance of deterioration of oil quality.

In still yet another embodiment of the present invention, enzymatic degumming is also performed without the addition citric acid and sodium hydroxide resulting in very high quality of gums.

Preferably 0.3 to 2.5% of water is added for various oils in the enzymatic degumming step.

Preferably, 2-4% of bleaching earth and 0.5 to 1% of activated carbon is used for the bleaching of enzymatically degummed oil.

Preferably, the dewaxing of degummed and bleached oils is carried out at a temperature range of 18-20° C. by cooling the oil from 70° C. at a rate of 0.2-0.5° C. per minute with a gentle stirring for 12 to 18 hours. Dewaxing step is necessary for only rice bran oil.

The present invention is an improved and economically attractive process for the pre-treatment of vegetable oils like rice bran oil, soybean oil etc., which comprises of (a) enzymatic degumming with commercial phospholipase $A_1$ obtained from the microbial sources like *Aspergillus oryzae* using protocols like addition of enzyme solution with an activity range from 200-520 units per kg of oil along with citric acid (0 to 0.065% of oil) and sodium hydroxide (0-0.02%) of oil in a single step and with or without maintaining any specific pH with a reaction period of 20 to 120 minutes, at a temperature of 35-45° C. followed by heating the oil to 70 to 80° C. and removal of gums using a continuous centrifuge followed by bleaching of enzymatically degummed oil using 2 to 4% bleaching earth and 0-1% activated carbon and dewaxing of degummed and bleached oil only in the case of rice bran oil by cooling the oil to 18-20° C. from 70° C. at a rate 0.2-0.5° C. per minute with a gentle stirring for 12 to 18 hours to obtain oil with less than 5 ppm of residual phosphorus which is amenable for physical refining.

DETAILS OF THE INVENTION

The present invention provides an enzymatic process for the pretreatment of vegetable oil which renders the step of using citric acid and sodium hydroxide optional and only as a buffer. The pretreatment of vegetable oils selected from the group consisting of rice bran oil, soybean oil, sunflower oil, and palm oil using enzymatic degumming, bleaching and dewaxing (in case of rice bran oil) to make these oils amenable for physical refining.

The initial water degumming step sued in some of the reported enzymatic processes is avoided. Commercial phospholipase $A_1$ isolated from microbial sources like *Aspergillus oryzae* is used for enzymatic degumming. Citric acid and sodium hydroxide used for maintaining pH of the medium are added together along with enzyme solution as a single dose. The reaction time for degumming is reduced considerably compared to the existing enzymatic processes.

The consumption of bleaching earth is also reduced to 0.5 to 1% compared to the conventional process for getting the similar quality of oil along with reduction of oil loss by way of spent bleaching earth particularly in case of rice bran oil. The conventional water wash step after degumming is avoided after enzymatic degumming resulting in an eco-friendly process with the reduction of oil loss. The oil is exposed for shorter durations at higher temperature compared to the conventional process and also in the enzymatic processes in the prior art, reducing the chance of deterioration of oil quality. Enzymatic degumming is also performed without the addition citric acid and sodium hydroxide resulting in very high quality of gums.

The broad applicability of the invention was examined by degumming vegetable oils like rice bran oil, soybean oil etc. using phospholipase $A_1$ followed by bleaching and dewaxing and thus, reducing the residual phosphorus level to less than 5 ppm.

Preferably, the enzymatic degumming is carried out using phospholipase $A_1$ ranging from 200-520 units/kg of oil. Preferably, 0-0.065% of citric acid and 0-0.02% of sodium hydroxide is added based on the weight of oil. Preferably there is employed 0.3 to 2.5% of water for various oils in the enzymatic degumming step. Preferably, there is employed a temperature of 35-45° C. Preferably, there is employed 20 to 120 minutes of reaction time. Preferably, there is employed 2-4% of bleaching earth and 0.5 to 1% of activated carbon for the bleaching of enzymatically degummed oil.

Preferably, the dewaxing of degummed and bleached oils is carried out at a temperature range of 18-20° C. by cooling the oil from 70° C. at a rate of 0.2-0.5° C. per minute with a gentle stirring for 12 to 18 hours. Dewaxing step is necessary for only rice bran oil.

Phospholipases catalyze the conversion of both hydratable as well as non-hydratable phospholipids into water-soluble-lyso phospholipids, which are then removed by centrifugation, yielding degummed oil low in phosphorus. Phospholipase $A_2$ selectively hydrolyzes the fatty acid attached to the $2^{nd}$ position of phospholipid, whereas phospholipase $A_1$ hydrolyzes the fatty acid from the $1^{st}$ position and in any case phospholipase do not cleave triglycerides. In the present invention commercial phospholipase $A_1$ isolated from microbial sources like *Aspergillus oryzae* is used for the enzymatic degumming.

The modest increase of FFA content in the enzyme-degummed oil is due to the fatty acids released during the enzymatic hydrolysis of the phospholipids present in the oil. Normally gums carry equal amount of triglycerides during the degumming process. In the enzymatic degumming the molecular weight and also the quantum of lyso phospholipids is less and hence the neutral oil carried with lysophospholipids is relatively less compared to the conventional degumming methods. The broad applicability of the invention was examined by degumming vegetable oils like rice bran oil, soybean oil etc., using phospholipase $A_1$ followed by bleaching and dewaxing and thus, reducing the residual phosphorus level to less than 5 ppm.

The present invention avoids the use of initial citric acid treatment as used in the lurgi et al process since non-hydratable phospholipids become hydrophilic after enzymatic hydrolysis to lysolecithin. Thus in the instant invention, the enzyme is mixed in an aqueous solution of citric acid and sodium hydroxide and directly mixed with the vegetable oil.

The following examples are given by the way of illustration and, therefore, should not be construed to limit the scope of the present invention.

EXAMPLE 1

Crude rice bran oil (1000 g) having phosphorus content of 348 ppm, color of 43 lovibond units in ¼" cell and acid value of 15.3 was taken in a 2000 ml beaker. Citric acid (0.65 g), sodium hydroxide (0.2 g) and Lecitase Novo enzyme (360 units) were dissolved in 15 ml water and added into the oil. The mixture was stirred thoroughly with the help of a high shear mixer (8000 rpm) for 20 minutes. The contents of the beaker were then transferred into a round bottom flask and stirred with the help of a mechanical stirrer for 60 minutes while maintaining a temperature of 40° C. Temperature of the oil was then raised to 70° C. followed by centrifugation. The degummed oil was then bleached with 4% activated bleaching earth and 1% activated carbon at 100° C. for 20 minutes at 700 mm of Hg vacuum. The oil was then cooled to 18° C. for a period of 18 hrs maintaining a cooling rate of 0.2° C. per minute with gentle stirring followed by filtration to remove waxes. The residual phosphorus level of the degummed, bleached and dewaxed oil (915 g having acid value of 15.9) was found to be 1 ppm and the color of the oil was found to be 25 lovibond color units (Y+5R in 1" cell) which is a feed for physical refining.

EXAMPLE 2

Crude rice bran oil (1000 g) having phosphorus content of 348 ppm, color of 43 lovibond units in ¼" cell and acid value of 15.3 was taken in a 2000 ml beaker. Citric acid (0.65 g), sodium hydroxide (0.2 g) and Lecitase Novo enzyme (360 units) were dissolved in 16 ml water and added into the oil. The mixture was stirred thoroughly with the help of a high shear mixer (8000 rpm) for 20 minutes maintaining a temperature of 40° C. Temperature of the oil was then raised to 70° C. followed by centrifugation. The degummed oil was then bleached with 4% activated bleaching earth and 1% activated carbon at 100° C. for 20 minutes at 700 mm of Hg vacuum. The oil was then cooled to 18° C. for a period of 18 hrs maintaining a cooling rate of 0.2° C. per minute with gentle stirring followed by filtration to remove, waxes. The residual phosphorus level of the degummed, bleached and dewaxed oil (915 g having acid value of 15.9) was found to be 1 ppm and the color of the oil was found to be 25 lovibond color units (Y+5R in 1" cell) which is a feed for physical refining.

EXAMPLE 3

Crude rice bran oil (1000 g) having phosphorus content of 348 ppm, color of 43 lovibond units (in ¼" cell) and acid value of 15.3 was taken in a 2000 ml beaker. Citric acid (0.65 g), sodium hydroxide (0.2 g) and Lecitase Novo enzyme (360 units) were dissolved in 15 ml water and added into the oil. The mixture was stirred thoroughly with the help of a high shear mixer (8000 rpm) for 10 minutes. The contents of the beaker were then transferred into a round bottom flask and stirred with the help of a mechanical stirrer for 60 minutes while maintaining the temperature of 40° C. Temperature of the oil was then raised to 70° C. followed by centrifugation. The degummed oil was then bleached with 4% activated bleaching earth and 1% activated carbon at 100° C. for 20 minutes at 700 mm of Hg vacuum. The oil was then cooled to 18° C. for a period of 18 hr maintaining a cooling rate of 0.2° C. per minute with gentle, stirring and followed by filtration to remove waxes. The residual phosphorus level of the degummed, bleached and dewaxed oil (916 g, having acid value of 16.0) was found to be 2 ppm which is a feed for physical refining.

EXAMPLE 4

Crude rice bran oil (1000 g) having phosphorus content of 348 ppm, color of 43 lovibond units in ¼" cell and acid value of 15.3 was taken in a 2000 ml beaker. Citric acid (0.32 g), sodium hydroxide (0.1 g) and Lecitase Novo enzyme (360 units) were dissolved in 16 ml water and added into the oil. The mixture was stirred thoroughly with the help of a high shear mixer (8000 rpm) for 20 minutes. The contents of the beaker were then transferred into a round bottom flask and stirred with the help of a mechanical stirrer for 60 minute while maintaining the temperature of 35° C. Temperature of the oil was then raised to 70° C. followed by centrifugation. The degummed oil was then bleached with 4% activated bleaching earth and 0.5% activated carbon at 100° C. for 20 minutes at 700 mm of Hg vacuum. The oil was then cooled to 18° C. for a period of 18 hours maintaining a cooling rate of 0.2° C. per minute with gentle stirring and followed by filtration to remove waxes. The residual phosphorus level of the degummed, bleached and dewaxed oil (915 g having acid value of 15.9) was found to be 2 ppm and the color of the oil was found to be 25 lovibond color units (Y+5R in 1" cell) which is amenable for physical refining.

EXAMPLE 5

Crude rice bran oil (1000 g) having phosphorus content of 348 ppm, color of 43 lovibond units in ¼" cell and acid value of 15.3 was taken in a 2000 ml beaker. 400 units of Lecitase Novo enzyme were dissolved in 16 ml water and added into the oil. The mixture was stirred thoroughly with the help of a high shear mixer (8000 rpm) for 20 minutes. The contents of the beaker were then transferred into a round bottom flask and stirred with the help of a mechanical stirrer for 60 minutes while maintaining the temperature of 45° C. Temperature of the oil was then raised to 70° C. followed by centrifugation. The degummed oil was then bleached with 4% activated bleaching earth and 1% activated carbon at 100° C. for 20 minutes at 700 mm of Hg vacuum. The oil was then cooled to 18° C. for a period of 18 hrs maintaining a cooling rate of 0.2° C. per minute with gentle stirring and followed by filtration to remove waxes. The residual phosphorus level of the degummed, bleached and dewaxed oil (912 g having acid value of 16.1) was found to be 2 ppm and the color of the oil was found to be 25 lovibond color units (Y+5R in 1" cell) which is amenable for physical refining.

EXAMPLE 6

Crude rice bran oil (1000 g) having phosphorus content of 528 ppm, color of 45 lovibod units in ¼" cell and acid value of 34.6 was taken in a 2000 ml beaker. Citric acid (0.65 g), sodium hydroxide (0.2 g) and Lecitase Novo enzyme 360 units were dissolved in 15 ml water and added into the oil. The mixture was stirred thoroughly with the help of a high shear mixer (8000 rpm) for 10 minutes. The contents of the beaker were then transferred into a round bottom flask and stirred with the help of a mechanical stirrer for 60 minutes while maintaining the temperature of 40° C. Temperature of the oil was then raised to 70° C. followed by centrifugation. The degummed oil was then bleached with 4% activated bleaching earth and 1% activated carbon at 100° C. for 20 minutes at 700 mm of Hg vacuum. The oil was then cooled to 18° C. for a period of 18 hrs maintaining a cooling rate of 0.2° C. per minute with gentle stirring and followed by filtration to remove waxes. The residual phosphorus level of the degummed, bleached and dewaxed oil (911 g having color of 26 lovibond units in 1" cell and acid value of 35.4) was found to be 2 ppm which is a feed for physical refining.

EXAMPLE 7

Crude rice bran oil (1000 g) having phosphorus content of 528 ppm, color of 45 lovibod units in ¼" cell and acid value of 34.6 was taken in a 2000 ml beaker. 400 units of Lecitase Novo enzyme were dissolved in 15 ml water and added into the oil. The mixture was stirred thoroughly with the help of a high shear mixer (8000 rpm) for 10 minutes. The contents of the beaker were then transferred into a round bottom flask and stirred with the help of a mechanical stirrer for 110 minutes while maintaining the temperature of 40° C. Temperature of the oil was then raised to 70° C. followed by centrifugation. The degummed oil was then bleached with 2% activated bleaching earth and 1% activated carbon at 100° C. for 20 minutes at 700 mm of Hg vacuum. The oil was then cooled to 18° C. for a period of 18 hrs maintaining a cooling rate of 0.2° C. per minute with gentle stirring and followed by filtration to remove waxes. The residual phosphorus level of the degummed, bleached and dewaxed oil (915 g having color of 29 lovibond units in 1" cell and acid value of 35.3) was found to be 3 ppm which is amenable for physical refining.

EXAMPLE 8

Crude rice bran oil (1000 g) having phosphorus content of 528 ppm, color of 45 lovibond units in ¼" cell and acid value of 34.6 was taken in a 2000 ml beaker. 400 units of Lecitase Novo enzyme was dissolved in 16 ml water and added into the oil. The mixture was stirred thoroughly with the help of a high shear mixer (8000 rpm) for 10 minutes. The contents of the beaker were then transferred into a round bottom flask and stirred with the help of a mechanical stirrer for 60 minutes while maintaining the temperature of 40° C. Temperature of the oil was then raised to 70° C. followed by centrifugation. The degummed oil was then bleached with 4% activated bleaching earth and 0.5% activated carbon at 100° C. for 20 minutes at 700 mm of Hg vacuum. The oil was then cooled to 18° C. for a period of 18 hrs maintaining a cooling rate of 0.5° C. per minute with gentle stirring and followed by filtration to remove waxes. The residual phosphorus level of the degummed, bleached and dewaxed oil (912 g) was found to be 3 ppm and the color of the oil was found to be 26 lovibond units (Y+5R) in 1" cell which is amenable for physical refining.

EXAMPLE 9

Crude rice bran oil (1000 g) having phosphorus content of 528 ppm, color of 45 lovibond units in ¼" cell and acid value of 34.6 was taken in a 2000 ml beaker. 360 units of Lecitase Novo enzyme was dissolved in 16 ml water and added into the oil. The mixture was stirred thoroughly with the help of a high shear mixer (8000 rpm) for 10 minutes. The contents of the beaker were then transferred into a round bottom flask and stirred with the help of a mechanical stirrer for one hour while maintaining the temperature of 40° C. Temperature of the oil was then raised to 70° C. followed by centrifugation. The degummed oil was then bleached with 4% activated bleaching earth and 1% activated carbon at 100° C. for 20 minutes at 700 mm of Hg vacuum. The oil was then cooled to 18° C. for a period of 18 hrs maintaining a cooling rate of 0.5° C. per minute with gentle stirring and followed by filtration to remove waxes. The residual phosphorus level of the degummed, bleached and dewaxed oil (909 g having acid value of 35.4) was found to be 3 ppm and the color of the oil was found to be 25 lovibond units (Y+5R) in 1" cell which is amenable for physical refining.

EXAMPLE 10

Crude rice bran oil (1000 g) having phosphorus content of 528 ppm, color of 45 lovibond units in ¼" cell and acid value of 34.6 was taken in a 2000 ml beaker. 360 units of Lecitase Novo enzyme was dissolved in 16 ml water and added into the oil. The mixture was stirred thoroughly with the help of a high shear mixer (8000 rpm) for 10 minutes. The contents of the beaker were then transferred into a round bottom flask and stirred with the help of a mechanical stirrer for 60 minutes while maintaining the temperature of 40° C. Temperature of the oil was then raised to 70° C. followed by centrifugation. The degummed oil was then bleached with 3% activated bleaching earth and 1% activated carbon at 100° C. for 20 minutes at 700 mm of Hg vacuum. The oil was then cooled to 18° C. for a period of 18 hrs maintaining a cooling rate of 0.2° C. per minute with gentle stirring and followed by filtration to remove waxes. The residual phosphorus level of the degummed, bleached and dewaxed oil (914 g having acid value of 35.3) was found to be 3 ppm and the color of the oil was found to be 25 lovibond units (Y+5R) in 1" cell which is amenable for physical refining.

EXAMPLE 11

Crude rice bran oil (1000 g) having phosphorus content of 260 ppm, color of 40 lovibond units in ¼" cell and acid value of 14.5 was taken in a 2000 ml beaker. 320 units of Lecitase Novo enzyme was dissolved in 16 ml water and added into the oil. The mixture was stirred thoroughly with the help of a high shear mixer (8000 rpm) for 10 minutes. The contents of the beaker were then transferred into a round bottom flask and stirred with the help of a mechanical stirrer for one hour while maintaining the temperature of 40° C. Temperature of the oil was then raised to 70° C. followed by centrifugation. The degummed oil was then bleached with 4% activated bleaching earth and 1% activated carbon at 100° C. for 20 minutes at 700 mm of Hg vacuum. The oil was then cooled to 18° C. for a period of 18 hrs maintaining a cooling rate of 0.5° C. per minute with gentle stirring and followed by filtration to remove waxes. The residual phosphorus level of the degummed, bleached and dewaxed oil (916 g having acid value of 15.1) was found to be 1 ppm and the color of the oil was found to be 25 lovibond units (Y+5R) in 1" cell which is amenable for physical refining.

EXAMPLE 12

Water degummed rice bran oil (1000 g) having phosphorus content of 120 ppm, color of 38 lovibond units in ¼" cell and acid value of 14.2 was taken in a 2000 ml beaker. 200 units of Lecitase Novo enzyme was dissolved in 15 ml water and added into the oil. The mixture was stirred thoroughly with the help of a high shear mixer (8000 rpm) for 20 minutes while maintaining the temperature at 40° C. Temperature of the oil was then raised to 70° C. followed by centrifugation. The degummed oil was then bleached with 4% activated bleaching earth and 1% activated carbon at 100° C. for 20 minutes at 700 mm of Hg vacuum. The oil was then cooled to 18° C. for a period of 18 hrs maintaining a cooling rate of 0.5° C. per minute with gentle stirring and followed by filtration to remove waxes. The residual phosphorus level of the degummed, bleached and dewaxed oil (914 g having acid value of 14.7) was found to be 1 ppm and the color of the oil was found to be 23 lovibond units (Y+5R) in 1" cell which is amenable for physical refining.

EXAMPLE 13

Crude soybean oil (1000 g) having phosphorus content of 350 ppm and acid value of 3.6 was taken in a 2000 ml beaker. Citric acid (0.65 g), sodium hydroxide (0.2 g) and 520 units of Lecitase Novo enzyme were dissolved in 25 ml water and added into the oil. The mixture was stirred thoroughly with the help of a high shear mixer (8000 rpm) for 20 minutes. The contents of the beaker were then transferred into a round bottom flask and stirred with the help of a mechanical stirrer for 100 minutes while maintaining the temperature of 40° C. Temperature of the oil was then raised to 70° C. followed by centrifugation. The degummed oil was then bleached with 2% activated bleaching earth and 0.5% activated carbon at 100° C. for 20 minutes at 700 mm of Hg vacuum followed by filtration. The residual phosphorus level of the degummed and bleached oil (934 g) was found to be 3 ppm that can be further refined by physical refining method.

EXAMPLE 14

Water Degummed soybean oil (1000 g) having phosphorus content of 200 ppm and acid value of 3.2 was taken in a 2000 ml beaker. 320 units of Lecitase Novo enzyme were dissolved in 25 ml water and added into the oil. The mixture was stirred thoroughly with the help of a high shear mixer (8000 rpm) for 20 minutes. The contents of the beaker were then transferred into a round bottom flask and stirred with the help of a mechanical stirrer for 100 minutes while maintaining the temperature of 40° C. Temperature of the oil was then raised to 70° C. followed by centrifugation. The degummed oil was then bleached with 2% activated bleaching earth and 0.5% activated carbon at 100° C. for 20 minutes at 700 mm of Hg vacuum followed by filtration. The residual phosphorus level of the degummed and bleached oil (936 g) was found to be 1 ppm that can be further refined by physical refining method.

EXAMPLE 15

Solvent extracted crude sunflower oil (1000 g) having phosphorus content of 300 ppm and acid value of 2.2 was taken in a 2000 ml beaker. 200 units of Lecitase Novo enzyme were dissolved in 15 ml water and added into the oil. The mixture was stirred thoroughly with the help of a high shear mixer (8000 rpm) for 20 minutes. The contents of the beaker were then transferred into a round bottom flask and stirred with the help of a mechanical stirrer for 100 minutes while maintaining the temperature of 40° C. Temperature of the oil was then raised to 80° C. followed by centrifugation. The degummed oil was then bleached with 2% activated bleaching earth 100° C. for 20 minutes at 700 mm of Hg vacuum followed by filtration. The residual phosphorus level of the degummed and bleached oil (936 g) was found to be 1 ppm that can be further refined by physical refining method.

EXAMPLE 16

Crude palm oil (1000 g) having phosphorus content of 18 ppm and acid value of 4.2 was taken in a 2000 ml beaker. 200 units of Lecitase Novo enzyme were dissolved in 3 ml water and added into the oil. The mixture was stirred thoroughly with the help of a high shear mixer (8000 rpm) for 20 minutes. The contents of the beaker were then transferred into a round bottom flask and stirred with the help of a mechanical stirrer for 100 minutes while maintaining the temperature of 40° C. Temperature of the oil was then raised to 70° C. followed by centrifugation. The degummed oil was then bleached with 2% activated bleaching earth and 0.5% activated carbon at 100° C. for 20 minutes at 700 mm of Hg vacuum followed by filtration. The residual phosphorus level of the degummed and bleached oil (936 g) was found to be 1 ppm that can be further refined by physical refining method.

The main advantages of the present invention are:

1. The present invention is an improved process for the pretreatment of vegetable oils like rice bran oil, soybean oil etc. suitable for the physical refining route.
2. The present invention uses the improved enzymatic degumming method wherein the enzyme (phospholipase $A_1$) used is isolated from microbial sources like *Aspergillus oryzae*.
3. The present invention considerably reduces the degumming time compared to the existing prior art of enzymatic degumming.
4. The present invention uses a method wherein citric acid, sodium hydroxide and enzyme solution are added together instead of addition in three different steps as reported in the existing methodologies.
5. The present invention is a very simple and economically attractive as there is no necessity to add citric acid solution at 70° C. followed by addition of sodium hydroxide at 40-60° C. and enzyme solution at 40° C. The aqueous solution of citric acid, sodium hydroxide and enzyme are added to oil at 40° C. with high shear mixing reducing the reaction time and saving energy.
6. The present invention uses a method wherein citric acid and sodium hydroxide are either not added or added in a much lesser quantities compared to the prior art of enzymatic degumming.
7. The present invention uses a method wherein in some cases no specific pH was necessary to maintain.
8. The present invention is an environmentally friendly process wherein no effluent is generated, as there is no water-wash step like in the conventional acid degumming process. In addition to this only a maximum of 1.6% of water for rice bran oil and 2 to 2.5% for other vegetable oils is added during enzymatic degumming compared to 2 to 4% reported for the conventional degumming method.
9. In the present invention the oil loss during enzymatic degumming process is lower than in the conventional phosphoric acid degumming. The gums obtained during enzymatic degumming are about 1.5% and the oil content of the gums is only 30-40% compared to 50-60% oil in 2-4% gums in conventional degumming. Thus, there is a saving of oil during the enzymatic degumming.
10. The present invention considerably reduces the neutral oil loss during degumming and bleaching steps.
11. The present invention is an improved process wherein a very good quality of oil having phosphorus content of less than 5 ppm is obtained after pretreatment.
12. The present invention, in general, does not require the initial water degumming step.
13. The present invention produces lyso-lecithin a by-product during enzymatic degumming that fetches more price compared to the lecithin produced by conventional processes.
14. In the present invention, the phospholipase Al enzyme used for degumming selectively hydrolyzes lecithin and does not hydrolyze triacylglycerols.
15. In the present invention, the fatty acid composition of the oil is not changed during its processing.
16. The pretreatment protocol described in the present invention can be easily adopted with little modifications in the existing vegetable oil refining industries.

We claim:

1. A process for the pretreatment of rice bran oil prior to physical refining of said oil, said process comprising subjecting the oil to enzymatic degumming using a phospholipase $A_1$ enzyme solution, heating the enzymatically treated oil to a temperature in the range of from 70° C. to 80° C. to obtain gums, separating the gums, and bleaching the degummed oil to obtain a bleached degummed oil.

2. The process as claimed in claim 1 wherein the oil is subjected to degumming without the addition of citric acid and sodium hydroxide.

3. The process as claimed in claim 1 wherein citric acid and sodium hydroxide are added to the oil along with the enzyme as a single dose in order to maintain the pH of the mixture.

4. The process as claimed in claim 3 wherein the amount of citric acid used is up to 0.065% by weight of oil and the amount of the sodium hydroxide used is up to 0.2% by weight of the oil.

5. The process as claimed in claim 1 wherein the degummed rice bran oil is subjected to dewaxing.

6. The process as claimed in claim 1 wherein the enzyme Phospholipase $A_1$ is isolated from a microbial source.

7. The process according to claim 6 wherein the microbial source is *Aspergillus oryzae*.

8. The process as claimed in claim 1 wherein the enzyme is added in the form of a solution with an activity in the range of 200-520 units per kg of oil.

9. The process as claimed in claim 1 wherein the bleaching is carried out using 2 to 4% bleaching earth and 0-1% activated carbon.

10. The process as claimed in claim 1 wherein the enzymatic degumming is carried out for a period in the range of 20 to 120 minutes and at a temperature of from 35 to 45° C.

11. The process as claimed in claim 1 wherein the removal of the gums after enzymatic treatment is carried out using a continuous centrifuge.

12. The process as claimed in claim 1 wherein the bleached and degummed oil is subject to cooling at a temperature in the range of 18 to 20° C. at a rate 0.2-0.5° per minute with gentle stirring for a time period in the range of 12 to 18 hours to obtain oil with less than 5 ppm of residual phosphorous.

13. The process as claimed in claim 1 wherein 0.3 to 2.5% of water is added in the enzymatic degumming step.

14. The process as claimed in claim 1 wherein the process comprises enzymatic degumming of the oil with phospholipase $A_1$ solution, obtained from a microbial source comprising *Aspergillus oryzae,* having an activity range from 200-520 units per kg of oil along with 0 to 0.065% citric acid and 0.0-0.02% sodium hydroxide by weight of oil, in a single step, and with or without maintaining any specific pH, with a reaction period of 20 to 120 minutes, at a temperature of 35 to 45° C., followed by heating of the oil to 70 to 80° C. and removing gums using a continuous centrifuges, followed by bleaching of the enzymatically degummed oil using 2 to 4% bleaching earth and 0.1% activated carbon, and then cooling the oil to 18 to 20° C. from 70° C. at a rate of 0.2-0.5° C. per minute with a gentle stirring for 12 to 18 hours to obtain oil with less than 5 ppm of residual phosphorous.

15. The process according to claim 1 wherein the oil content of the gums is in the range of 30-40%.

* * * * *

UNITED STATES PATENT AND TRADEMARK OFFICE

CERTIFICATE OF CORRECTION

PATENT NO. : 7,494,676 B2
APPLICATION NO. : 10/449698
DATED : February 24, 2009
INVENTOR(S) : Pradosh Prasad Chakrabarti et al.

It is certified that error appears in the above-identified patent and that said Letters Patent is hereby corrected as shown below:

On the Title Page
Please insert after Item (22) Filed

-- INDIAN PATENT APPLICATION 597/DEL/2002 May 30, 2002 --

Signed and Sealed this

Second Day of June, 2009

JOHN DOLL
*Acting Director of the United States Patent and Trademark Office*